United States Patent Office 3,189,664
Patented June 15, 1965

3,189,664
BLOCK COPOLYMERS
Kenzie Nozaki, El Cerrito, Calif., assignor to Shell Oil
Company, New York, N.Y., a corporation of Delaware
No Drawing. Filed June 22, 1961, Ser. No. 118,772
16 Claims. (Cl. 260—881)

This invention relates to a new type of copolymers. More particularly, the invention relates to new block copolymers and a method for their preparation.

Specifically, the invention provides new and particularly useful block copolymers comprising copolymers wherein the macromolecules are made up of two different linear segments joined in an end to end arrangement, the first segment being made up of linear polymer of certain organic compounds containing a $CH_2=C=$ group, and the other segment being made up of a polymer of a dissimilar monomer containing at least one polymerizable ethylenic group. A process for preparing these new block copolymers is also provided.

This application is a continuation-in-part of my copending application Ser. No. 566,774, filed February 21, 1956, now U.S. Patent No. 2,991,269, which in turn is a continuation-in-part of application Serial No. 270,278, filed February 6, 1952 now abandoned, which in turn is a continuation-in-part of application Serial No. 60,416, filed November 16, 1948 now abandoned.

Attempts have been made in the past to improve the properties of many of the homopolymers of the unsaturated monomers by copolymerizing the said monomers with various dissimilar compounds, the homopolymers of which display the desired superior properties. These copolymers have been prepared heretofore by merely mixing the unsaturated compound with the desired dissimilar monomer and then subjecting the resulting mixture to polymerization conditions, such as heat, light and catalysts. When combined under these conditions, the two monomers usually add to the polymer chain in a more or less random fashion and the resulting polymer chains are made up of a very complicated arrangement of the two kinds of monomers. Copolymers prepared from monomers A and B, for example, will have the A and B units arranged in some such order as ABAABBBABBAABB. This method of producing the desired copolymers is not entirely satisfactory. It has been found, for example, that when the monomer units are distributed throughout the polymer chains in the above-described manner they fail to impart the properties of their corresponding homopolymers and the resulting copolymers in many cases possess an entirely different set of properties. Furthermore, as there is no definite control over the order in which the monomers add to the polymer chain, the copolymers produced by this process rarely, if ever, have the same molecular structure or physical properties and standardization of the copolymers and their applications is quite difficult.

It is, therefore, an object of the invention to provide a new kind of copolymer. It is a further object to provide a new type of copolymers which possess many of the characteristic properties of the homopolymers of the individual monomers making up the said copolymer. It is a further object to provide a new type of copolymer having many unusual and beneficial properties. It is a further object to provide new copolymers having improved plasticizing properties. It is a further object to provide novel segmented copolymers having unexpected properties as detergents, dispersing agents and the like. It is a further object to provide a new block copolymers having improved strength. It is a further object to provide new block copolymers which have substantially uniform molecular weights. It is still a further object to provide a new block copolymers from alkenes and cycloalkene.

These and other objects of the invention will be apparent from the following detailed description thereof.

It has not been discovered that these and other objects may be accomplished by the new block copolymers of the invention comprising copolymers wherein the macromolecules are made up of two different linear segments joined in an end to end arrangement, the first segment being made up of a linear polymer of an organic compound containing a single $CH=C=$ group, and the other segment being made up of a polymer of at least one monomer containing at least one polymerizable ethylenic group, one of the latter monomer or monomers being dissimilar to the monomer unit in the first segment. These new copolymers are prepared by a novel process comprising adding a preformed linear polymer which is substantially free of carbon-to-carbon unsaturation and has a molecular weight of at least 50,000 to a liquid medium containing an ethylenically unsaturated monomer which is dissimilar to the monomer unit contained in the preformed polymer, and then subjecting the resulting mixture in an inert atmosphere to mechanical agitation to degrade the said preformed polymer. This process is based on the unexpected discovery that when a linear polymer of high enough molecular weight is subjected to a mechanical agitation treatment of considerable intensity, the polymer chains are broken to form polymer free radicals and when polymerizable ethylenically unsaturated monomers are brought in contact with these free radicals, there is an addition of the said monomers to the polymer chains. The resulting copolymers thus possess an entirely different structure from the above-described conventional type polymers. The copolymers prepared by the process of the invention are made up of one section of the inducing polymer joined to a section of a polymer of the dissimilar monomer. Thus, the copolymer prepared by this process from an inducing polymer of A in monomer B may be represented as having the structure AAAAAABBBBBBBBB.

The different molecular structure of the copolymers of the present invention as discussed above endows them with properties which are entirely different from those possessed by the conventional copolymers. As indicated above, the conventional copolymers lose the characteristic properties of the homopolymers of the monomers making up the said copolymers and assume properties which are entirely different. The copolymers of the present invention, on the other hand, retain many of the characteristic properties of the homopolymers of the individual monomers. A copolymer made up of a segment of polyacrylonitrile joined to a segment of polystyrene produced by the process of the invention will, for example, possess the characteristic properties of both polystyrene and polyacrylonitrile.

An important application of the process of the invention is its use in the production of "internally" plasticized polymers, i.e., polymers wherein the plasticizer is joined to the polymer through a primary chemical bond. The production of this type of polymer is accomplished by selecting as the inducing polymer, i.e., the preformed polymer, a polymer which is softer and more flexible than the polymer of the added monomer, such as polyvinyl acetate, and using as the added monomer a compound which would ordinarily form a hard, brittle polymer, such as vinyl chloride, or the inducing polymer selected may be one that is hard and brittle and the added monomer may be one that forms the softer, more flexible polymer. In either case, the resulting product is a polymer that possesses substantially all the desired properties of the brittle polymer and the flexibility of the soft, flexible polymer. As the plasticizer is chemically bound in the molecule, there is no danger of its loss through migration or volatilization.

A further important application of the process of the invention is its use in the preparation of polymers having unexpected solution behavior. Polymers having the unexpected property of having solubility in both water and oil may be obtained by the novel process, for example, by employing as the inducing polymer a hydrocarbon polymer, such as polyisobutylene, polystyrene, etc., and as the unsaturated monomer a compound having groups that have water soluble characteristics or could be converted to groups having water soluble characteristics, such as vinyl acetate, acrylonitrile, methyl methacrylate, and the like, or alternatively by employing a polymer having water soluble characteristics or being able to be converted to a water soluble polymer as the inducing agent, and the hydrocarbon component as the unsaturated monomer. Copolymers prepared in this manner are particularly useful as detergents and as dispersing agents for preparing suspensions and emulsions of various components, such as metal oxides, that will not precipitate either in aqueous or hydrocarbon systems.

Still another important application of the process of the invention is its use in the production of copolymers from monomers that have heretofore never been able to be polymerized together. By the use of the process of the invention, for example, it is now possible to copolymerize components, such as cellulose derivatives, linear polyamides, polyesters, and monomeric compounds as isobutylene, ethylene, and the like, with many components with which they have heretofore never been able to be combined.

Additional advantage of the process is found in the fact that it may be accomplished in the absence of catalysts and relatively high temperature and yields products of higher quality and more uniform molecular weight.

The copolymers of the present invention are distinguished in structure and properties from the copolymers prepared by forming a prepolymer of a polyethylenically unsaturated monomer, such as piperylene, and then polymerizing another monomer at the remaining unsaturation in the prepolymer molecule. As the unsaturated prepolymer will possess unsaturated linkages in the main chain, such as

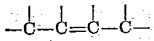

and/or in the side chains, such as

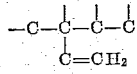

the resulting copolymer will always have the dissimilar monomers adding on at the side of the main polymer chain and the product will be a highly branched copolymer having a structure, such as

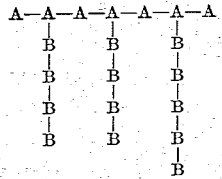

wherein A is the monomer unit derived from the polyunsaturated compound and B is the monomer unit of the dissimilar monomer.

The copolymers prepared from the prepolymers of the polyunsaturated compounds, such as piperylene, as described above, will not have any of the superior properties of the segmented copolymers of the present invention. Such copolymers will have the dissimilar monomers distributed along the main polymer chain and the properties will generally be the same as those of the conventional copolymer which are prepared by mixing the monomers at the beginning of the polymerization. Further, copolymers prepared from the prepolymers of the polyunsaturated compounds will be highly branched and thus have higher viscosity and poorer solubility and compatibility characteristics than the unbranched polymers as shown in the example at the end of the specification.

The preformed polymer to be used in the process of the invention may be any polymer which has a linear structure, i.e., is not cross-linked, and is substantially free of aliphatic carbon-to-carbon unsaturated linkages, i.e., unable to undergo further polymerization with unsaturated monomers when heated in the presence of peroxide catalysts. As noted above, the preformed polymer undergoes polymerization in the present process by means of free radicals formed when the polymer is broken, and the polymerization is not due to the presence of any unsaturated linkage in the molecule itself.

The preformed polymer may be one that occurs naturally or one that has been produced synthetically. The polymer may be a homopolymer, copolymer or interpolymer. If the preformed polymers are synthetic they may be produced by any suitable method. They may be produced, for example, by addition reactions, condensation reactions, and the like. The reactions may be energized if desired by light and/or heat and may be accomplished in the presence of any type polymerization catalyst, such as peroxides, peracids, persalts, peresters, metals, inorganic salts, Friedel-Crafts type catalysts and the like. The polymers may be prepared by bulk polymerization, in a solvent solution or in an aqueous emulsion or aqueous suspension. Polymers prepared by a previous operation of the process of the present invention may also be utilized.

Examples of the preformed polymers that may be used in the process of the invention are cellulose esters and cellulose ethers, such as cellulose acetate, cellulose nitrate, cellulose propionate butyrate, cellulose acetobutyrate, eythl cellulose, butyl cellulose, and propyl cellulose; phenol aldehyde condensation polymers, such as phenol-formaldehyde polymers, phenol-acetaldehyde polymers, and resorcinol-formaldehyde polymers; polysulfide polymers, and the like; the vinyl polymers, such as polyvinyl chloride, polystyrene, polyacrylonitrile, and the like; linear alkyl resins, such as the polyesters of glycol and phthalic acid, 1,3-pentanediol and succinic acid, glycol and glutaric acid, and the like; linear polyamides, such as the one obtained by reacting trimethyladipic acid with hexamethylene-diamine; polymers of ethylene oxide and tetrahydrofuran; polymers of the carbonic acid esters of the unsaturated diols, such as butadiene-3,4 carbonate, polymers of the unsaturated esters of the unsaturated acids, such as diethyl fumarate, diethyl maleate, and the like.

A preferred group of preformed relatively high molecular weight, linear polymers to be used in the process of the invention are the homopolymers, copolymers and interpolymers of the polymerizable olefinic compounds containing a $>C=C<$ group such as the polymers of maleic acid and maleic acid esters, tetrahaloethylenes, vinyl-type compounds, etc. Particularly preferred are the polymers of monomers containing at least one $CH_2=C<$ group. Examples of the polymers of monomers containing at least one $CH_2=C=$ group are the polymers of isobutylene, ethylene, propylene, octene-1, the aromatic compounds, such as styrene, alpha-methylstyrene, dichlorostyrene, vinyl naphthalene, vinyl phenol and the like. Other examples are the polymers of the unsaturated acids, such as acrylic acid and the alpha-alkyl substituted acrylic acids, such as alpha-methyl acrylic acid and alpha-butyl acrylic acid, the polymers of the esters of these unsaturated acids, such as methyl acrylate, methyl methacrylate, butyl methacrylate, and propyl acrylate; the polymers of the vinylidene halides, such as vinylidene chloride and vinylidene bromide; the polymers of the vinyl esters of inorganic acids, such as the halogen acids, and hydrocyanic acid, as vinyl chloride, vinyl bromide, acrylonitrile, and methacrylonitrile; polymers of the vinyl esters of the monocarboxylic acids, such as vinyl acetate, vinyl chloroacetate, vinyl benzoate, vinyl laurate, vinyl valerate, and vinyl caproate; the polymers of the vinyl ethers, such as vinyl ethyl ether, and the vinyl ketones, such as vinyl butyl ketone, and vinyl ethyl ketone.

Especially preferred preformed polymers to be used in the process of the invention are the relatively high molecular weight linear polymers of the compounds of the group consisting of the vinylidene halides, acrylic acid and alpha-alkyl substituted acrylic acids wherein the alkyl radical contains from 1 to 4 carbon atoms, the alkyl esters of acrylic acids and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene. Examples of this particularly preferred group of preformed polymers are polyvinylidene chloride; polyvinyl bromide, polyvinyl fluoride, polymethyl methacrylate, polymethacrylonitrile, polyisobutylene, polyacrylic acid, polyethacrylic acid, polyethyl acrylate, polybutyl acrylate, polystyrene, polymethylstyrene, a copolymer of 10% vinyl chloride and 90% vinylidene chloride, a copolymer of 25% methacrylonitrile and 75% methyl methacrylate, a copolymer of 40% styrene and 60% vinyl chloride, a copolymer of 50% vinyl fluoride and 50% ethacrylonitrile, an interpolymer of 5% methyl methacrylate, 30% methylstyrene and 60% methacrylonitrile, an interpolymer of 30% vinylidene chloride, 20% vinyl chloride and 50% methyl methacrylate, and an interpolymer of 3% vinyl acetate, 40% vinyl butyrate, 30% methyl methacrylate, and 27% methacrylonitrile.

In case the process of the invention is to be used for the production of internally plasticized polymers as described above, the preformed polymers to be utilized may be those polymers which are softer, more flexible than the preformed high molecular weight linear polymer. Examples of such polymers are the polymers of methyl methacrylate, vinyl acetate, vinyl propionate, vinyl butyrate, vinyl chloroacetate, methyl acrylate, ethyl acrylate, butyl methacrylate, octyl methacrylate, n-dodecyl methacrylate, and methyl vinyl ketone.

Coming under special consideration as the linear polymer to be used in the process of the invention are the polymers of the aliphatic monethylenically unsaturated compounds containing from 2 to 10 carbon atoms, such as ethylene, isobutylene, octene-1, and the like, and mixtures thereof. The polymers of isobutylene are particularly as the copolymers prepared therefrom are especially unique. While in some cases it has been possible to add a few isobutylene monomer units to other monomers by the conventional processes, the products have generally been liquid conglomerates of little practical utility. The process of the invention, however, enables one to obtain valuable copolymers of isobutylene containing a much higher number, e.g., 75, 100 or more, of isobutylene units. Such product are solid resins which can be utilized for many important industrial applications, such as in the preparation of coating compositions, adhesive and impregnating compositions, self-sustaining films, solid plastic articles, and the like.

The aforesaid isobutylene copolymers are generally prepared by utilizing as the inducing polymer, a relatively high molecular weight polymer of isobutylene, such as an isobutylene homopolymer prepared by use of a Friedel-Crafts catalyst, and adding this polymer to the desired monomer as described hereinafter, such as the vinylidene halides, the vinyl halides, the unsaturated nitriles, the alkenyl esters of the saturated monocarboxylic acids, the alkyl esters of the ethylenically unsaturated acids, and the vinyl aromatic compounds, and subjecting the resulting mixture to the desired mechanical treatment to break the polyisobutylene chains.

The molecular weight of the preformed polymers should be sufficiently high to permit a degradation of the polymer molecule when the said polymer is subjected to the subsequent agitation treatment. The molecular weight of the preformed polymers used in the process of the invention will, therefore, vary over a considerable range depending upon the ease with which the individual polymer may be degraded, the intensity of the agitation treatment, etc. In some cases polymers having molecular weights as low as $5 \times 10^4$ may be used in the process. In other cases polymers having a molecular weight as high as $9 \times 10^6$ or higher may be used. The preferred polymers to be used in the process have molecular weights between $7.5 \times 10^4$ and $7 \times 10^6$. These molecular weights were determined by measuring the intrinsic viscosity of the polymer in solution and calculating the molecular weight as discussed by P. J. Flory in the Journal of the American Chemical Society, 65 372 (1943).

The monomers to be mixed with the above-described polymers may be any of the polymerizable organic compounds containing at least one polymerizable ethenoid group, i.e., organic compounds containing at least one polymerizable $>C=C<$ group. These polymerizable olefinic compounds may be exemplified by maleic and fumaric acids and their esters, the tetrahalo-ethylenes, the esters of the unsaturated diols, etc. Preferred polymerizable olefinic compounds to be employed in the process of the invention are the vinyl-type compounds, i.e., those polymerizable organic compounds containing at least one $CH_2=C<$ group in their molecule. Examples of such monomers are the butadienes, such as butadiene-1,3 2,3-dimethylbutadiene-1,3, piperylene, isoprene, chloroprene, the aromatic compounds, such as styrene, alpha-methyl-styrene, dichlorostyrene, vinyl naphthalene, vinyl phenol and the like. Other examples of the vinyl-type compounds are the unsaturated acids, such as acrylic acid and the alpha-alkyl substituted acrylic acids, such as alpha-methyl acrylic acid and alpha-butyl acrylic acid; the esters of these unsaturated acids, such as methyl acrylate, methyl methacrylate, butyl methacrylate, and propyl acrylate; the vinylidene halides, such as vinylidene chloride and vinylidene bromide; the vinyl esters of inorganic acids, such as the halogen acids, and hydrocylanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl laurate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; and the vinyl ketones, such as vinyl butyl ketone, and vinyl ethyl ketone. The group also includes the allyl derivatives, such as the allyl esters of the monocarboxylic acids, as allyl acetate and allyl butyrate; the allyl esters of the polycarboxylic acids, such as diallyl phthalate, diallyl adipate, and diallyl succinate; the allyl esters of the inorganic acids, such as allyl chloride, methallyl chloride, etc.; the allyl esters of the unsaturated acids, such as allyl acrylate, allyl crotonate, and methallyl methacrylate, and the allyl ketones, allyl ethers, and the like.

A preferred group of vinyl-type compounds are the members of the group consisting of the vinylidene halides, acrylic acid and alpha-alkyl substituted acrylic acids wherein the alkyl radical contains from 1 to 4 carbon atoms, the alkyl esters of acrylic acid and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the acrylic acid and alpha-alkyl substituted acrylic acid wherein the alkyl radical contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene. Examples of this preferred group of vinyl-type compounds are vinylidene chloride, vinylidene bromide, vinylidene iodide, methyl acrylate, butyl acrylate, butyl alpha-butyl acrylate, vinyl acrylate, vinyl acetate, vinyl butyrate, vinyl methacrylate, and the like.

In case the monomer is to be added to produce a plasticizing effect on the resulting polymer the ones selected will be those which form polymers which are softer and more flexible than the preformed high molecular weight, linear polymer, such as methyl methacrylate, vinyl acetate, vinyl propionate, vinyl butyrate, methyl acrylate, and the like.

Block copolymers of the invention which are particularly outstanding, especially because of the attractive plastic articles that can be molded therefrom are those wherein the initial polymer to be broken is selected from the group consisting of polymers of esters of ethylenically unsaturated monohydric alcohols and carboxylic acids, alkenes, vinyl halides, vinylidene halides, ethylenically unsaturated nitriles, alkenyl ethers and alkenyl ketones, and the dissimilar monomer used in the process is one selected from the group consisting of esters of ethylenically unsaturated alcohols and carboxylic acids, alkenes, vinyl halides, vinylidene halides, ethylenically unsaturated nitriles, alkenyl ethers and alkenyl ketones.

Coming under special consideration are block copolymers prepared from a segment selected from the group consisting of polymers of alkenyl esters of monocarboxylic acids containing up to 10 carbon atoms, alkenes containing from 2 to 5 carbon atoms, vinyl chloride, vinylidene chloride, compounds of the formula R—CN wherein R is an alkenyl radical containing up to 8 carbon atoms and especially acrylonitrile, alkyl alkenyl ethers containing up to 8 carbon atoms and alkyl alkenyl ketones containing up to 10 carbon atoms, and the other segment is a dissimilar polymer selected from the aforedescribed group.

The reaction is generally accomplished in a liquid medium. The monomer or monomers to be polymerized, if liquid, may themselves form the medium or liquids, such as water, organic solvents or diluents, such as benzene, cyclohexane, xylene, hexane, diheptyl ether, and the like, and mixtures thereof may be added to the reaction mixture. In most cases, it is preferred to use only the monomer as the reaction medium and to employ conditions to maintain the monomer in the liquid phase. The medium need not dissolve the polymer, but it has been found that better results are obtained if there is at least a partial dissolution of the polymer.

The quantity of the preformed inducing polymer to be added to the reaction may vary over a considerable range. In most instances, it is desirable to keep the amount of polymer at a relatively low level so that there will be more opportunity for the chains to be spread out and broken near the middle. If the medium becomes too concentrated with respect to the polymer, the polymer chains may become entangled and only those segments sticking out of the bundle may be broken. Preferably the polymer is employed in amounts varying from 0.5 to 10 parts per 100 parts of medium, and more preferably from 0.8 to 5 parts per 100 parts of medium.

The amount of dissimilar monomer to be present in the reaction mixture will also vary over a wide range. If the monomer is employed as the liquid medium for the reaction, the amount of monomer will be relatively large in order to obtain the desired degree of dilution. In that case, the reaction may be stopped as soon as the desired amount of monomer has been added to the polymer chain. In case another reaction medium, such as an inert solvent is employed, the amount of monomer added will depend generally upon the amount of monomer that is to be added to the polymer chains.

Molecular oxygen will inhibit the polymerization reaction and it is usually desirable to remove the oxygen from the reaction chamber before the degradation is commenced. In the case of a few monomers, such as styrene, however, small quantities of oxygen may be tolerated. The removal of the oxygen may be accomplished by any suitable method. It is preferably accomplished by freezing the mixture of preformed polymer and monomer and evacuating the reaction chamber by means of a pump. In some cases it may be desirable to replace the withdrawn oxygen with an inert gas, such as nitrogen, methane, carbon dioxide, and the like.

The process of the invention may be accomplished in the presence or absence of light. As light has an accelerating effect on the polymerization of some types of monomers, it may be desirable in some cases to conduct the reaction in the presence of light in order to increase the polymerization rate.

The agitation treatment applied to the deoxygenated reaction mixture may be any suitable treatment which will apply sufficient strain and tensions on the bonds of the polymer to break the polymer chains. Mechanical treatments, such as shaking, high speed stirring, milling, grinding, gear and piston pumps, passage through filters and capillaries, are satisfactory. The degradation of the preformed polymer is preferably accomplished by passing the reaction mixture through variously designed throttle values, or narrow orifices at high linear velocity. For this purpose an enclosed system and a circulating gear pump or diaphragm pump capable of generating high hydrostatic pressures have proved very satisfactory. Another preferred method comprises subjecting the reaction mixture to high speed stirring, e.g., stirring at the rate of about 4000 r.p.m.

The amount of shear stress to be applied to the reaction mixture will vary over a considerable range depending upon the type of polymer to be broken, e.g., whether it contains —C—C—, —C—S—, —C—O—, —S—S—, etc., bonds, the molecular weight of the polymer, the viscosity of the solution, etc., but it should be at least sufficient to break the linear polymer. The shear stress applied by the usual slight shaking or stirring of the containers in the laboratory is not sufficient to bring about the desired degradation. In general, the minimum shear stress applied to the solution should be that determined by the following formula $$\frac{2\times10^{12}}{(M.W.)^2}=\text{dynes/cm.}^2$$

wherein M.W. is the molecular weight of the linear polymer. Preferably with polymers having the main chain consisting chiefly of —C—C—, —C—S—, —C—O, or —S—S— bonds, which polymers are present in amounts varying from 0.5% to 10% by weight of the reactants, the minimum stress should be determined by the formula $$\frac{1\times10^{14}}{(M.W.)^2}=\text{dynes/cm.}^2$$

and more preferably $$\frac{2\times10^{15}}{(M.W.)^2}=\text{dynes/cm.}^2$$

wherein M.W. is the molecular weight of the linear polymer. Increasing the shear stress increases the formation of polymer free radicals and this in turn increases the rate of reaction, so faster reaction rates may be obtained by using shear stresses which are in considerable excess of those described above.

The temperature at which the process may be carried out may also vary considerably. In general temperatures ranging from 0° C. to 250° C. have proved satisfactory. Particularly preferred temperatures range between 0° C. and 100° C. Atmospheric, superatmospheric, or subatmospheric pressures may be used in the process as desired. The polymers formed in the reaction may be recovered by any suitable means, such as filtration, solvent extraction, dehydration and the like.

The process of the invention may be executed in any convenient type apparatus enabling the maintenance of the proper conditions and the introduction of the various reactants. The process may be carried out in batch, semi-continuous or continuous manner. For large scale production it is preferred to conduct the process in a continuous manner. In such an operation the preformed polymer and monomer or monomers will be continuously added and the polymers continuously removed from the reaction mixture. The operation of the process in a continuous manner is particularly desirable as such an operation presents much more stable conditions and the composition of the resulting polymers are more uniform and of better quality.

As described above, the copolymers produced by the process of the invention will generally be substantially colorless polymers having a uniform molecular weight. Plasticized compositions produced from the said polymers possess excellent strength and flexibility. The resins may be cut, milled, machined to produce the various articles of commerce, such as buttons, table tops, containers, and the like. In the molten or solvent solution the polymers, may be utilized in the preparation of impregnating agents, laminating agents, surface coatings, and the like. They may also be subjected to extrusion and to injection and compression molding in the presence or absence of added diluents and plasticizers.

To illustrate the manner in which the invention may be carried out the following examples are given. It is to be understood, however, that the examples are for the purpose of illustration and the invention is not to be regarded as limited to any of the specific conditions cited therein.

The deoxygenation of the preformed polymer-monomer mixture in the following examples was accomplished by freezing the said mixture in liquid nitrogen, evacuating on an oil pump, melting, and repeating the step three more times.

As described above, the copolymers produced by the above-described process will be block copolymers, i.e., they are made up of two or more segments of polymers joined in an end-to-end arrangement, the first segment being made up of the preformed polymer of the alkenyl-substituted aromatic compound and the other segment or segments being made up of the polymer of the added monomer or monomers. The copolymers will have molecular weights ranging from about 10,000 to 750,000 (as determined by the intrinsic viscosity measurements as noted above) depending on intensity of the mechanical agitation. In most cases, the molecular weights of the macromolecules will be substantially uniform due to the tendency of agitation to reduce the macromolecules to the same molecular weight level.

The new copolymers will preferably contain at least 5% by weight of the alkenyl-substituted aromatic compound, and preferably from 5% to 99% by weight of the said material. On a macromolecular structural basis, the molecules should preferably contain at least 5 units of the alkenyl-substituted aromatic compound and at least 5 units of the dissimilar monomer.

The block copolymers of the invention may be used for a variety of applications. They will be hard solid materials which can generally be molded or extruded to form attractive plastic articles. They may also be milled, machined, cut or otherwise formed into articles, such as buttons, table tops, containers and the like. In the molten or solvent solution the polymers may be utilized in the preparation of impregnating agents, laminating agents, surface coatings and the like. They may also be subjected to extrusion and to injection and compression molding in the presence or absence of added diluents and plasticizers.

The apparatus used for shaking the reaction mixture in the examples below consisted of a cylindrical glass vessel (5.08 cm. in diameter and 12.7 cm. in length) joined on one side to a vertical spring-loaded rod that was in sliding contact with a cam eccentrically mounted on the shaft of an electric motor. When the motor was on, the vessel containing the reaction mixture moved back and forth through a distance of 11.5 cm.

In some of the examples cited below the polymerization has been conducted in the absence of light. This precaution was taken merely to indicate that the polymerization taking place in the reaction mixture was not due to any accelerating affect of light.

EXAMPLE I (a) About 10 parts of polymethacrylonitrile having a molecular weight of $5.4 \times 10^6$ were mixed with about 2500 parts of acrylonitrile and the mixture deoxygenated. Tubes containing the mixture were sealed in vacuo and a stress of 500 dynes/cm.$^2$ applied to the solution. This was done by moving the glass vessel containing the solution back and forth over a distance of 11.5 cm. at the rate of 300 times a minute. After shaking for 138 hours, 149 parts of copolymer had been obtained. This represented a copolymer made up of a segment of polymethacrylonitrile and a segment of polyacrylonitrile.

(b) The same procedure as described in (a) was repeated using samples of polymethacrylonitrile having various molecular weights. The results are shown in the table below:

| Molecular Weight | Poly MAN,[1] parts | AN,[2] parts | Shaking Time, hrs. | Total polymer | Poly AN |
|---|---|---|---|---|---|
| $9.2 \times 10^6$ | 10 | 2,500 | 160 | 138 | 128 |
| $9.2 \times 10^6$ | 50 | 2,500 | 160 | 207 | 157 |
| $3.4 \times 10^5$ | 10 | 2,500 | 160 | 44 | 34 |
| $3.4 \times 10^5$ | 50 | 2,500 | 160 | 263 | 213 |

[1] MAN=methacrylonitrile.
[2] AN=acrylonitrile.

Samples of the above-described copolymers were tested for solubility in acetone. A sample containing 39% polyacrylonitrile was completely dispersed into a milky colloidal solution which was stable after three weeks standing and could not be filtered through a sintered glass filter funnel. This indicates that all of the polyacrylonitrile was attached to relatively large acetone soluble polymethacrylonitrile fragments, which aided dispersion.

A sample containing 83.5% polyacrylonitrile was mixed with acetone. Less than 2% of the polymer was soluble in this solvent indicating that substantially all of the 16.5% polymethacrylonitrile was attached to the polyacrylonitrile.

EXAMPLE II

This example illustrates the difference in structure and properties of the new type copolymers of the present invention as compared to graft polymers prepared by simply heating a prepolymer of a polyethylenically unsaturated monomer such as butadiene, isoprene or piperylene, with a dissimilar monomer.

(A) 25 parts of natural rubber crepe having a molecular weight of about 500,000 are dissolved in 1500 parts of benzene and 1500 parts of styrene are added thereto. Tubes containing this mixture are sealed in vacuo, darkened and a stress of 500 dynes/cm.$^2$ applied by shaking the tubes at room temperature as shown in Example I. After 200 hours, the shaking is stopped and the unreacted styrene and benzene solvent removed under vacuum. 50 parts of a solid copolymer containing a segment of polyisoprene (25 parts) to a segment of polystyrene (25 parts) is obtained. No separate homopolymer of styrene can be removed from the new copolymer by known solvent precipitation methods so all of the styrene must be attached to the copolymer.

(B) An old type graft copolymer is prepared as follows: 50 parts of the natural rubber crepe described in (A) above is combined with 50 parts of styrene in benzene and the mixture heated for 10 days at 100° C. Unpolymerized material is then removed along with the benzene. A solid thermoplastic polymeric composition is obtained. When subjected to solvent precipitation technique, a large part of the polymer is recovered and identified as pure homopolymer of styrene.

(C) The new type copolymer prepared in (A) above is compared with the polymer prepared in (B). The polymer prepared in (B) is much more brittle than the polymer prepared in (A) and has a low temperature brittle point of at least 15° C., below that of the polymer of (A). Further, the polymer of (B) is insoluble in hexane which is a poor solvent for polystyrene homopolymer, while the polymer produced in (A) is soluble in that solvent.

EXAMPLE III

This example demonstrates that to obtain the new type copolymer one must utilize polymers of high molecular weight, and that one cannot obtain the copolymers by simply exposing low molecular weight polymers, such as disclosed in U.S. 2,317,859, to mechanical agitation.

A piperylene prepolymer is prepared as follows: a piperylene fraction containing 85% piperylene is combined with toluene to reduce the piperylene concentration to about 25%. 5 percent by weight of boron-trifluoride diethyl ether is then added. The temperature of the mixture is maintained at −20° C. for 25 hours. The catalyst is then hydrolyzed with sodium carbonate and the polymer recovered. The resulting solid soluble polymer has a molecular weight of about 10,500.

25 parts of the polymer produced above is combined with 1500 parts of styrene and 1500 parts of benzene. Tubes containing the mixture are sealed in vacuo, darkened and a stress of 500 dynes/cm.$^2$ applied by shaking at room temperature. After 200 hours of shaking, the reaction mixture is removed and separated into a fraction containing the initial polymer and substantially all of the initial unpolymerized styrene. There is no detectable formation of polystyrene in the initial polymeric composition. This indicates that the initial polymer was not of sufficient molecular weight to be broken into polymer free radicals.

Exposure of the above reaction mixture to ultrasonic radiations at a frequency of 500 kilocycles under the same conditions also fails to cause any formation of the new type copolymer as all the styrene was recovered unattached.

EXAMPLE IV

About 10 parts of polymethacrylonitrile having a mol. weight of $5.4 \times 10^6$ are mixed with 1500 parts of monomeric vinylidene chloride and 1000 parts of cyclohexanone and the resulting mixture is deoxygenated. The mixture is then exposed to a stress of at least 500 dynes/cm.$^2$ by repeatedly forcing it at a pressure of about 1000 p.s.i. through a unit containing a thin platinum sheet containing a single orifice which has a diameter between 0.005 in. to 0.01 in. to degrade the polymethacrylonitrile. In about 30 hours there is about a 20 fold increase in the weight of the polymer. The product is identified as a polymer made up of a segment of polymethacrylonitrile jointed to a segment of polyvinylidene chloride.

EXAMPLE V

About 10 parts of polymethyl methacrylate having a molecular weight of $8.7 \times 10^6$ were added to 2500 parts of methacrylonitrile and the mixture deoxygenated. Tubes containing the mixture were sealed in vacuo and a stress of about 500 dynes/cm.$^2$ applied to the mixture by shaking as noted in Example I at the rate of about 300 strokes a minute. This reaction required a much more vigorous shaking as the methacrylonitrile was a relatively poor solvent for polymethyl methacrylate. The resulting product was 72.4 parts of a copolymer made up of a segment of polymethyl methacrylate joined to a segment of polymethacrylonitrile.

The above process was repeated using 2500 parts of acrylonitrile in place of the methacrylonitrile. In this case, the product was identified as a polymer comprising a segment of polymethyl methacrylate joined to a segment of polyacrylonitrile.

EXAMPLE VI

About 10 parts of polymethyl methacrylate having a molecular weight of $8.7 \times 10^6$ were added to 2500 parts of styrene and the mixture deoxygenated. Tubes containing the mixture were sealed in vacuo, and then shaken at 330 strokes a minute at room temperature. The resulting product was 65 parts of a copolymer made up of a segment of polymethyl methacrylate joined to a segment of polystyrene.

EXAMPLE VII

About 6 parts of polystyrene having a molecular weight of $6.33 \times 10^6$ were added to 1500 parts of methyl methacrylate and 1500 parts of toluene. Tubes containing the mixture were sealed in vacuo, darkened, and then shaken at 330 strokes a minute at room temperature. After about 120 hours of shaking 128 parts of a copolymer made up of a segment of polystyrene joined to a segment of polymethyl methacrylate were obtained.

EXAMPLE VIII

About 10 parts of polyvinyl acetate are added to 1500 parts of toluene and 1500 parts of vinyl chloride. Tubes containing the mixture are sealed in vacuo, darkened, and shaken at 330 strokes a minute at room temperature. After 100 hours a large yield of a copolymer of polyvinyl chloride and polyvinyl acetate is obtained. This internally plasticized copolymer is compared in properties and flexibility with a conventional copolymer of vinyl acetate and vinyl chloride. The internally plasticized copolymer possesses substantially the same flexibility as the conventional copolymer and in addition possesses many of the more desirable characteristic properties of polyvinyl chloride not possessed by the conventional copolymer.

EXAMPLE IX 24 parts of polyisobutylene having a molecular weight of $2.2 \times 10^6$ prepared with a Friedel-Crafts catalyst at −80° C. were added to 1500 parts of styrene and 1500 parts of benzene. Tubes containing the mixture were sealed in vacuo, darkened, and shaken at 330 strokes a minute at room temperature. After 120 hours of shaking 53 parts of a solid copolymer containing a segment of polyisobutylene and a segment of polystyrene were obtained. The copolymer could be molded to form an attractive plastic article.

EXAMPLE X

About 8 parts of polyisobutylene having a molecular weight of $2.2 \times 10^6$ prepared with a Friedel-Crafts catalyst were added to 2000 parts of vinylidene chloride and the mixture deoxygenated. Tubes containing the mixture were sealed in vacuo, darkened, and shaken at 330 strokes a minute at room temperature. After one week of shaking 310 parts of solid copolymer containing a segment of polyisobutylene and a segment of polyvinylidene chloride were obtained. This polymer could also be molded to form a plastic article.

EXAMPLE XI

About 10 parts of polyisobutylene having a molecular weight of $2.2 \times 10^6$ were added to about 2000 parts of acrylonitrile and 100 parts of cyclohexane and the resulting mixture deoxygenated. The mixture was then repeatedly passed through a narrow orifice between 0.005 inch and 0.01 inch as in Example II. At the end of 30 hours about 200 parts of a solid copolymer had been obtained. The copolymer contained about 25% of polyisobutylene and 75% acrylonitrile.

EXAMPLE XII

About 50 parts of polyisobutylene having a molecular weight of $2.2 \times 10^6$ are added to about 2000 parts of vinyl acetate and 1000 parts of cyclohexane and the resulting mixture deoxygenated. The mixture is then repeatedly passed through a narrow orifice as shown in Example II. At the end of about 24 hours, a yield of 200 parts of copolymer had been obtained. The resulting product made up of a segment of polyisobutylene joined to a segment of polyvinyl acetate is then subjected to mild hydrolysis to convert the acetate groups to hydroxyl groups. The hydrolyzed copolymer shows unusual solubility characteristics as it has solubility in both water and oil.

EXAMPLE XIII

About 50 parts of polymethyl methacrylate having a molecular weight of about $7.2 \times 10^6$ were mixed with 200 parts of vinyl chloride, and the mixture deoxygenated. Tubes containing the mixture were sealed in vacuo, darkened, and shaken at 330 strokes a minute at room temperature. At the end of 8 days of shaking, 215 parts of a solid copolymer comprising 50 parts of polymethyl methacrylate and 165 parts of polyvinyl chloride were obtained.

The copolymer possesses many of the physical and chemical properties of the polyvinyl chloride alone, and can be processed without the addition of any plasticizer to form flexible resins.

EXAMPLE XIV

About 50 parts of polymethyl acrylate prepared by polymerizing 1 volume of monomer per 3 volumes of water containing .3% sodium lauryl sulfate and no catalyst (molecular weight approximately 500,000) were added to 2100 parts of vinyl chloride and the mixture deoxygenated. Tubes containing the mixture were sealed in vacuo and shaken at 330 strokes a minute at room temperature. 420 parts of a copolymer containing a segment of polymethyl acrylate and a segment of polyvinyl chloride were obtained.

This process was repeated using 2100 parts of acrylonitrile in place of the vinyl chloride. In this case the resulting product was a polymer comprising a segment of polymethyl acrylate joined to a segment of polyacrylonitrile.

EXAMPLE XV

About 10 parts of polyvinyl chloride having a molecular weight of $4.2 \times 10^5$ were added to 1000 parts of methyl vinyl ketone and 100 parts of cyclohexanone and the mixture deoxygenated. Tubes containing the mixture were sealed in vacuo and shaken at 330 strokes a minute at room temperature. 298 parts of a solid copolymer containing a segment of polyvinyl chloride and a segment of polymethyl vinyl ketone were obtained. This polymer could be molded to form an attractive plastic article.

EXAMPLE XVI

An 0.4 solution of polymethacrylonitrile having a molecular weight of $5.4 \times 10^6$ in acrylonitrile was deoxygenated by bubbling with oxygen-free nitrogen and sealed under a nitrogen pressure. The tubes containing the mixture were treated with ultrasonic radiation at a frequency of 500 kilocycles for fifteen minutes. The resulting product was a solid copolymer containing a segment of polymethacrylonitrile and a segment of polyacrylonitrile.

EXAMPLE XVII

About 20 parts of a conventional copolymer of 25% vinyl chloride and 75% methacrylonitrile (molecular weight approximately $5 \times 10^5$) are added to 100 parts of methyl methacrylate, 200 parts of cyclohexanone and the mixture deoxygenated. Tubes containing the mixture are sealed in vacuo and shaken at 330 strokes a minute at room temperature. The resulting product is an interpolymer containing a segment of poly-(vinyl chloride-methacrylonitrile) and a segment of polymethyl methacrylate.

EXAMPLE XVIII 10 parts of a copolymer of 10 parts of polymethyl methacrylate and 55 parts of polystyrene prepared in Example VI above are added to 2500 parts of methacrylonitrile and the mixture deoxygenated. Tubes containing the mixture are shaken at about 500 strokes a minute at room temperature. The resulting product is an interpolymer containing a segment of a poly(methylmethacrylate-polystyrene) copolymer and a segment of polymethacrylonitrile.

EXAMPLE XIX 10 parts of polymethyl methacrylate having a molecular weight of $8.7 \times 10^6$ were added to a mixture of 500 parts acrylonitrile and 500 parts of vinylidene chloride. The resulting mixture is deoxygenated and shaken at 330 strokes a minute at room temperature. The resulting product is an interpolymer containing a segment of polymethyl methacrylate joined to a segment of a copolymer of acrylonitrile and vinylidene chloride.

EXAMPLE XX 8 parts of polymethacrylonitrile having a molecular weight of $5.4 \times 10^6$ were added to 1000 parts of acrylonitrile and the resultant mixture was stirred at 4000 r.p.m. at 10° C. At the end of 30 minutes, 13.4 parts of a solid copolymer containing a segment of polymethacrylonitrile joined to a segment of polyacrylonitrile was obtained. At the end of 90 minutes, the amount of copolymer had increased to 17.8 parts.

EXAMPLE XXI 10 parts of a linear polyamide of trimethyladipic acid and hexamethylenediamine (molecular weight approximately $1 \times 10^5$) are added to 500 parts of acrylonitrile and 200 parts of cyclohexanone and the resulting mixture stirred at 4000 r.p.m. at 20° C. At the end of 2 hours a large yield of a copolymer made up of a segment of a polymeric reaction product of trimethyladipic acid and hexamethylene-dismine joined to a segment of polyacrylonitrile is obtained.

EXAMPLE XXII

About 20 parts of ethyl cellulose are added to 500 parts of methyl methacrylate and 200 parts of cyclohexanone and the resulting mixture stirred at 4000 r.p.m. at 25° C. A copolymer made up of a segment of ethyl cellulose and a segment of polymethyl methacrylate is obtained as the final product.

EXAMPLE XXIII

Solid copolymers made up of a segment of polymethyl methacrylate joined to a segment of polyvinylidene chloride, solid copolymers made up of a segment of polymethyl acrylate joined to a segment of polyvinylidene chloride and solid copolymers made up of a segment of polystyrene joined to a segment of polyvinylidene chloride were prepared by adding polymethyl methacrylate, polymethyl acrylate and polystyrene separately to 20 part portions of monomeric vinylidene chloride and shaking the resulting mixtures for one week at 330 strokes per minute at room temperature. The results are indicated in the table below. Each of the polymers could be molded to form attractive plastic articles.

| Polymer and Monomer Used in the Polymerization | Mol. Weight of the Polymer in Col. 1 | Weight of Original Polymer Shown in Col. 1 | Weight of Polymer after 1 Week of Shaking | Weight of Polymer in Control Sample Which Was not Shaken | Weight of Polymer Formed by Shaking (Col. 4 Less Col. 3 and 5) |
|---|---|---|---|---|---|
| Polymethyl methacrylate vinylidene chloride. | $8.7 \times 10^5$ | 0.20 | 3.13 | 0.08 | 2.85 |
| Polymethyl acrylate vinylidene chloride. | approx. $5 \times 10^5$. | 0.20 | 1.07 | 0.08 | 0.79 |
| Polystyrene vinylidene chloride. | $6.33 \times 10^6$ | 0.20 | 4.87 | 0.08 | 4.59 |

EXAMPLE XXIV

About 20 parts of a homopolymer of vinylidene chloride having a molecular weight of about $5 \times 10^5$ are added to 100 parts of vinyl butyrate, 200 parts of cyclohexanone and the mixture deoxygenated. Tubes containing the mixture are sealed in vacuo and shaken at 330 strokes a minute at room temperature. The resulting product is identified as a segmented copolymer made up of a segment of poly(vinylidene chloride) joined to a segment of poly(vinyl acetate). This copolymer can be molded to form attractive plastic articles.

EXAMPLE XXV

About 10 parts of a homopolymer of vinyl butyl ether having a molecular weight of about $4 \times 10^5$ are added to 100 parts of vinyl propionate, 200 parts of cyclohexanone and the mixture deoxygenated. Tubes containing the mixture are sealed in vacuo and shaken at 330 strokes a minute at room temperature. After several days, the tubes are opened and the unreacted monomer and solvent removed. The resulting product is identified as a segment copolymer made up of a segment of poly(vinyl butyl ether) joined to a segment of poly(vinyl propionate). This copolymer can be molded to form attractive plastic articles.

EXAMPLE XXVI

About 10 parts of a homopolymer of vinyl butyl ketone having a molecular weight of $5 \times 10^5$ are added to 1000 parts of acrylonitrile. Tubes containing this mixture are sealed in vacuo and a stress of 500 dynes/cm² applied to the solution by moving the glass vessel containing the solution back and forth over a distance of 11.5 cm. at the rate of about 300 strokes a minute. After several days, the tubes are opened and the unreacted monomer removed. The resulting product is a copolymer made up of a segment of poly(vinyl butyl ketone) joined in an end-to-end arrangement with a segment of poly-(acrylonitrile).

EXAMPLE XXVII

About 10 parts of a polymer of vinyl propyl ether having a molecular weight of about $6 \times 10^5$ are added to 100 parts of vinyl butyrate and 200 parts of cyclohexanone and the mixture deoxygenated. Tubes containing the mixture are sealed in vacuo and shaken at 330 strokes a minute at room temperature. After several days, the tubes are opened and the monomer and solvent removed. The resulting product is a copolymer made up of a segment of poly(vinyl butyrate) joined to a segment of poly(vinyl propyl ether).

EXAMPLE XXVIII

Example XXV is repeated with the exception that the homopolymer of vinyl butyl ether is replaced by a copolymer of 50% vinyl butyl ether and maleic anhydride. Related results are obtained.

EXAMPLE XXIX

Example XXVI is repeated with the exception that the homopolymer of vinyl butyl ketone is replaced by each of the following: homopolymer of vinyl ethyl ketone, homopolymer of vinyl isobutyl ketone, and homplymer of methyl isopropenyl ketone, and a copolymer of 50% vinyl ethyl ketone and 50% maleic anhydride. Related results are obtained.

EXAMPLE XXX

Examples X, XI and XII are repeated with the exception that the isobutylene polymer is replaced by each of the following: polyethylene having a molecular weight of $5 \times 10^6$, and polypropylene having a molecular weight of $4 \times 10^5$. Related results are obtained.

EXAMPLE XXXI

Example XXVII is repeated with the exception that the alkenyl ether polymer is replaced by a polymer of each of the following: vinyl isopropenyl ether, vinyl amyl ether and vinyl phenyl ether. Related results are obtained.

I claim as my invention:

1. A new type of copolymer wherein the macromolecules are made up of at least two different linear segments joined in an end to end arrangement, the first segment being a linear polymer of a member of the group consisting of esters of ethylenically unsaturated alcohols and saturated monocarboxylic acids containing from 1 to 6 carbon atoms, alkenes, vinyl halides, vinylidene halides, ethylenically unsaturated nitriles, alkenyl ethers and alkenyl ketones, and the second segment being a polymer of a dissimilar monomer selected from the above-described group.

2. A block copolymer as in claim 1 wherein the first segment is a polymer of an alkene-1 containing up to 10 carbon atoms.

3. A block copolymer as in claim 1 wherein the first segment is polyisobutylene.

4. A block copolymer as in claim 1 wherein the first segment is a polymer of vinyl ester of a monocarboxylic acid containing up to 8 carbon atoms.

5. A block copolymer as in claim 1 wherein the first segment is a polymer of vinyl chloride.

6. A block copolymer as in claim 1 wherein the first segment is a polymer of vinylidene chloride.

7. A block copolymer as in claim 1 wherein the first segment is a polymer of acrylonitrile.

8. A block copolymer as in claim 1 wherein the first segment is a polymer of an alkenyl alkyl ether containing up to 8 carbon atoms.

9. A block copolymer as in claim 1 wherein the first segment is a polymer of an alkenyl alkyl ketone containing up to 8 carbon atoms.

10. A block copolymer made up of two different linear polymer segments joined in an end to end arrangement, the first segment being a polymer of an alkene-1 containing up to 8 carbon atoms, and the second segment being a polymer of acrylonitrile.

11. A block copolymer made up of two different linear polymer segments joined in an end to end arrangement, the first segment being a polymer of isobutylene, and the second segment being a polymer of a vinyl ester of a saturated monocarboxylic acids containing from 1 to 6 carbon atoms.

12. A block copolymer made up of two different linear polymer segments joined in an end to end arrangement, the first segment being a polymer of an alkene-1 containing up to 8 carbon atoms and the second segment being a polymer of a dissimilar alkene-1 containing up to 8 carbon atoms.

13. A block copolymer made up of two different linear polymer segments joined in an end to end arrangement, the first segment being a polymer of an alkene-1 containing up to 8 carbon atoms and the second segment being a polymer of a vinylidene halide.

14. A block copolymer made up of two different linear polymer segments joined in an end to end arrangement, the first segment being a polymer of isobutylene, and the second being a polymer of vinyl chloride.

15. A block copolymer made up of two different linear polymer segments joined in an end to end arrangement, the first segment being a polymer of vinyl chloride, and the second segment being a polymer of methyl vinyl ketone.

16. A block copolymer made up of two different linear polymer segments joined in an end to end arrangement, the first segment being polyisobutylene and a second segment being a polymer of acrylonitrile.

References Cited by the Examiner

UNITED STATES PATENTS

| | | | |
|---|---|---|---|
| 2,123,599 | 7/38 | Fikentscher et al. | 260—17 |
| 2,317,859 | 4/43 | Soday | 260—880 |
| 2,338,741 | 1/44 | Soday | 260—880 |
| 2,538,779 | 1/51 | Harrison et al. | 260—879 |
| 2,991,269 | 7/61 | Nozaki | 260—4 |

MURRAY TILLMAN, *Primary Examiner.*

WILLIAM H. SHORT, JAMES A. SEIDLECK,
*Examiners.*